2,886,608
Patented May 12, 1959

2,886,608

PRODUCTS AND PROCESS

John J. Drysdale, Wilmington, Del., assignor to E. I. du Pont de Nemours and Company, Wilmington, Del., a corporation of Delaware No Drawing. Application March 18, 1957
Serial No. 646,551

5 Claims. (Cl. 260—666)

This invention relates to unsaturated organic compounds and more particularly to unsaturated cyclic organic compounds having a 7-membered ring and a process for their preparation.

Unsaturated organic compounds have found use in many applications, particularly in the form of their polymers which are useful in many practical applications, for example, as films, fibers, adhesives, coating compositions, molding compositions, and the like. One of the factors influencing the properties of the polymers is the particular structure of the monomer from which the polymer is made.

New ways of making polymerizable unsaturated compounds and of providing novel unsaturated compounds which can be polymerized to polymers having new and improved properties are continually being sought. Such a process and such compounds and polymers thereof are the subject of the present invention.

The process of this invention comprises pyrolyzing, at a temperature of 550° to 850° C. under a pressure of less than one atmosphere, a 5-alkylidene-bicyclo[2.2.1]hept-2-ene having no substituents on the annular carbons in the 1-, 3-, and 6-positions, having at least one hydrogen on the annular carbon in the 7-position, any substituents on the annular carbons in the 2-, 4-, and 7-positions and on the doubly bonded carbon of the alkylidene group being monovalent hydrocarbon radicals free of aliphatic unsaturation with the total number of carbon atoms in all such substituents not exceeding six.

The products of this invention are methylenecycloheptadienes of the formula $C_8H_{10}$, i.e., cycloheptadienes in which the methylene group is the sole substituent in the ring, and their polymers.

The process of this invention is illustrated by the following equation:

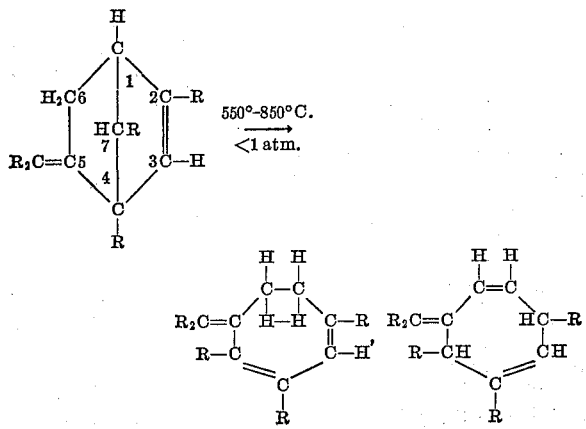

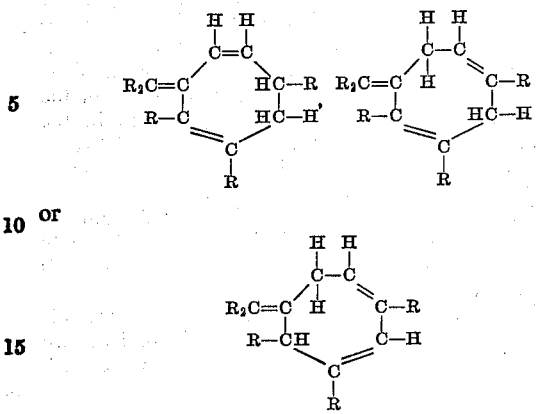

wherein the R groups can be the same or different and represent hydrogen, alkyl, phenyl, or cycloalkyl groups, with the proviso that the total number of carbons in all the R groups is not over six.

The process of this invention is preferably carried out by passing the 5 - alkylidenebicyclo[2.2.1]hept - 2 - ene through a reaction zone heated to a temperature of from 650°–700° C. under a pressure of 1–50 mm. mercury. Operating temperatures of from 650° to 700° C. are preferred since they give better yields of the desired alkylidenecycloheptadienes. Lower temperatures give lower conversions. Low operating pressures, i.e., 1–50 mm. of mercury, are preferred since they permit more rapid passage of the reactants through the heated reaction zone. A short contact time of the reactant at the operating temperature is important in obtaining optimum yields of the alkylidenecycloheptadienes.

It is also preferred to cool the reaction mixture rapidly after it leaves the pyrolysis zone. This is conveniently done by immediately passing the reaction mixture through a trap cooled to low temperature, e.g., through a trap cooled by liquid nitrogen. This permits the maintenance of the reaction zone at the desired low-operating pressure by rapidly condensing low-boiling by-products formed during the pyrolysis.

The reactor in which the 5-alkylidenebicyclo[2.2.1]hept-2-ene is pyrolyzed can be constructed of any inert, heat-resistant material. For example, the reactor can be made of quartz, heat-resistant glass, stainless steel, or other inert metal. The reactor can, if desired, be packed with inert materials, e.g., granular quartz, to provide better heat transfer. The reaction zone can be heated by conventional means. Electric heaters are very satisfactory for this purpose.

A specific type of reactor which is satisfactory in carrying out the process of this invention consists of a vertical cylindrical reaction tube approximately 1" in diameter and 12" long made of quartz or of a heat-resistant glass, e.g., the type of glass known commercially as "Vycor." The reaction tube is packed with 6-mm. sections of quartz tubing 6 mm. in diameter and is heated externally by means of a cylindrical electric resistance furnace. The temperature of the reaction zone is recorded by a thermocouple placed in the center of the reaction tube. A high capacity vacuum pump maintains the reaction system at the desired reduced pressure. Pressures down to a few microns of mercury can be obtained by the use of a mercury diffusion pump. In this apparatus, the pressure is measured between the pump and the cold trap in which the pyrolysis products are collected. The cold trap is conveniently cooled by liquid nitrogen. The 5-alkylidenebicyclo[2.2.1]hept-2-ene reactant is gradually introduced into the reaction zone by conventional means, e.g., by means of a dropping funnel or by distillation.

The 5-alkylidenebicyclo[2.2.1]hept-2-ene starting materials for the process of this invention can be prepared by heating to a temperature of 150°–250° C. in the absence of a polymerization initiator, and preferably in the presence of a polymerization inhibitor, equimolar quantities of appropriate allenes and cyclopentadienes. For example, 2 moles of allene and 1 mole of dicyclopentadiene (which, at the operating temperature, is partially in the form of monomeric cyclopentadiene) is heated in the presence of pentane as the reaction medium and hydroquinone as the polymerization inhibitor at 200° C. under autogenous pressure for several hours. The resulting 5-methylenebicyclo[2.2.1]hept-2-ene is isolated from the reaction mixture by fractional distillation, and is ready for use as the starting material in the process of this invention.

This invention is illustrated in further detail in the following examples, in which proportions of ingredients are expressed in parts by weight unless otherwise specified.

Example I

A vertical cylindrical tube of the type described above is heated to 700° C. and maintained at a pressure of 1–2 mm. mercury. Sixty parts of 5-methylene-bicyclo[2.2.1]hept-2-ene is passed gradually through the heated tube during a period of about 30 minutes. The reaction product, methylenecycloheptadiene, is collected in a trap which is cooled by a bath of liquid nitrogen. Attempted distillation of portions of this reaction product at one atmosphere (116–142° C.) and at 50 mm. mercury pressure results, in both cases, in extensive polymerization to low molecular weight polymers of methylenecycloheptadiene.

Example II

The process of Example I is repeated with 55 parts of 5-methylenebicyclo[2.2.1]hept-2-ene. The cold trap containing the reaction product is subjected to a pressure of 100 mm. mercury, and the lower boiling products consisting of cyclopentadiene and allene are removed without subjecting the mixture to external heat. A new trap is then placed in the system and the methylene cycloheptadiene is vaporized into the trap at 0.05 mm. mercury pressure. This product has a refractive index, $n_D^{25}$, of 1.5155. The nuclear magnetic resonance analysis of this material shows the presence of vinyl and saturated hydrogens in a 3:2 ratio. No methyl hydrogens are detected. This is the predicted spectrum for methylenecycloheptadiene. This product is believed to be a mixture of the cycloheptadiene isomers, i.e., 1-methylenecyclohepta-2,4-diene, 1-methylenecyclohepta-2,5-diene, 1-methylenecyclohepta-2,6-diene, and 1-methylenecyclohepta-3,5-diene.

The yield of methylenecycloheptadiene is estimated to be 50%, with the remainder of the product being a mixture of allene and cyclopentadiene. This by-product allene and cyclopentadiene can be reacted again to form the starting 5-methylenebicyclo[2.2.1]hept-2-ene.

One hundred thiry parts of methylenecycloheptadiene reaction product obtained from 405 parts of 5-methylenebicyclo[2.2.1]hept-2-ene by the process of Examples I and II is reduced by hydrogenation with palladium-on-carbon catalyst in methanol solvent under 40 lb./sq. in. hydrogen pressure. The total hydrogen used is 80–85% of the theoretical required to reduce all double bonds. Approximately 120 parts of an organic layer is isolated after removal of methanol from the hydrogenation product by extraction with water. A portion of the organic layer (40 parts) is distilled and there is obtained 35 parts boiling at 129–136° C. A nuclear magnetic resonance analysis and a negative potassium permanganate test indicate that the hydrogenation product is composed of methylcycloheptane, xylenes, and dimethylcyclohexanes.

Twenty parts of this material is placed in 25 parts of glacial acetic acid containing 0.5 part of concentrated hydrochloric acid. Platinum oxide catalyst is added and the mixture is shaken under 40 lbs. hydrogen pressure. Approximately 4 lbs. of hydrogen is absorbed. Water is added to the hydrogenation layer and the organic layer is separated and then distilled. The following fractions are obtained:

| Fraction | B.P., °C. | $n_D^{28}$ | Amount, ml. |
|---|---|---|---|
| 1 | up to 132 | 1.4315 | 4.0 |
| 2 | 132–133 | 1.4368 | 3.5 |
| 3 | 133 | 1.4374 | 3 |
| 4 | 133–135 | 1.4380 | 3 |
| 5 | 135–136 | 1.4389 | 3 |
| 6 | 136 | 1.4389 | 2 |
| 7 | 136 | 1.4389 | 2 |

Nuclear magnetic resonance analysis shows that fractions 5, 6, and 7 are essentially pure methylcycloheptane. Lower fractions are believed to be composed of methylcycloheptanes and dimethylcyclohexanes.

*Analysis.*—Calcd. for $C_8H_{16}$: C, 85.63%; H, 14.37%. Found: C, 86.33%; H, 14.03%

Example III

Sixty parts of methyl-5-methylenebicyclo[2.2.1]hept-2-ene is passed through a tube of the type described previously at 700° C. and at a pressure of 3–6 mm. Hg during approximately 30 minutes. The reaction product is collected in a trap cooled by liquid nitrogen and is subjected to distillation at 10 mm. at room temperature (25° C.) for one hour. The residue is then distilled at 0.5 mm. from a water bath maintained at 50–60° C., and there is obtained 19.3 parts of liquid having a refractive index, $n_D^{25}$, of 1.4965. The refractive index of the starting material is 1.4780. The liquid product is a mixture of isomeric methylmethylenecycloheptadienes of the formula $C_9H_{12}$, in which the methyl and methylene groups are attached to the cycloheptadiene ring.

The starting material for Example III is prepared by the addition of allene to methylcyclopentadiene. Methylcyclopentadiene is believed to be a mixture of isomers in which the predominant isomer has the methyl group in the 2-position, with a smaller amount of the isomer having the methyl group in the 1-position. The methylcyclopentadieneallene adduct has a refractive index, $n_D^{25}$, of 1.4780.

The preceding examples have illustrated the process of my invention by specific reference to the pyrolysis of 5-methylenebicyclo[2.2.1]hept-2-ene and methyl-5-methylene-bicyclo[2.2.1]hept-2-ene with the formation of methylenecycloheptadienes and their polymers and methyl-methylenecycloheptadienes, respectively. However, any 5-alkylidenebicyclo[2.2.1]hept-2-ene of the type defined previously can be isomerized by the process of this invention to alkylidenecycloheptadienes. Specific 5-alkylidenebicyclo[2.2.1]hept-2-enes that can be substituted for the bicyclo compounds in the examples for the preparation of alkylidenecycloheptadienes include:

5-ethylidenebicyclo[2.2.1]hept-2-ene
5-isopropylidenebicyclo[2.2.1]hept-2-ene
2-n-butyl-5-methylenebicyclo[2.2.1]hept-2-ene
7-phenyl-5-methylenebicyclo[2.2.1]hept-2-ene
2-cyclohexyl-5-methylenebicyclo[2.2.1]hept-2-ene
4-ethyl-5-isopropylidenebicyclo[2.2.1]hept-2-ene The alkylidenecycloheptadienes obtained by the process of this invention are useful in various applications. They are especially useful for polymerization, alone or with other copolymerizable ethylenic compounds, to polymers useful as films, coating compositions, and the like. In addition to the polymerization of methylenecycloheptadiene as in Example I, the alkylidenecycloheptadienes can be copolymerized with a variety of ethylenically unsaturated monomers in the presence of free radical-liberating initiators. For example, methylenecycloheptadiene can be copolymerized with acrylonitrile, methyl methacrylate, styrene, butadiene, chloroprene, and the like, in the presence of benzoyl peroxide or α,α'-azodiisobutyronitrile, to form copolymers useful in various applications, e.g., coating compositions, films, and adhesives.

The foregoing detailed description has been given for clearness of understanding only and no unnecessary limitations are to be understood therefrom. The invention is not limited to the exact details shown and described for obvious modifications will occur to those skilled in the art.

I claim:

1. A process for preparing alkylidenecycloheptadienes which comprises pyrolyzing at a temperature of from 550–850° C. under a pressure of less than one atmosphere a 5-alkylidenebicyclo[2.2.1]hept-2-ene having no substituents on the annular carbons in the 1-, 3-, and 6-positions, having at least one hydrogen on the annular carbon in the 7-position, any substituents on the annular carbons in the 2-, 4-, and 7-positions and on the doubly bonded carbon of the alkylidene group being monovalent hydrocarbon radicals free of aliphatic unsaturation, the total number of carbon atoms in all such substituents not exceeding six.

2. A process for preparing alkylidenecycloheptadienes which comprises passing a 5-alkylidenebicyclo[2.2.1]-hept-2-ene of the formula

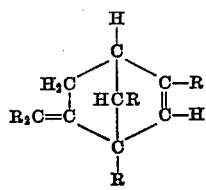

wherein R is selected from the class consisting of hydrogen, alkyl, phenyl and cycloalkyl groups, the total number of carbon atoms in all the R groups ranging from zero to six, thru a reaction zone heated to a temperature of from 650° to 700° C. and maintained under a pressure of from 1 to 50 mm. mercury.

3. The process of claim 1 wherein the alkylidenebicyclo[2.2.1]hept-2-ene is 5-methylenebicyclo[2.2.1]hept-2-ene.

4. A mixture of isomeric methylenecycloheptadienes.

5. A polymer of methylenecycloheptadiene.

References Cited in the file of this patent
UNITED STATES PATENTS

| | | |
|---|---|---|
| 2,537,638 | Kitchen | Jan. 9, 1951 |
| 2,721,189 | Anderson et al. | Oct. 18, 1955 |
| 2,754,337 | Chirtel et al. | July 10, 1956 |

OTHER REFERENCES

Egloff: Physical Constants of Hydrocarbons, vol. II, 1940, ACS Monograph 78, Reinhold Pub. Co., N.Y., pp. 431–438.

Faraday: Encyclopedia of Hydrocarbon Compounds, vol. 3A, $C_8H_{10}$, p. 08019.12.11 to p. 08034.00.11, 1953, Chemindex Limited, Manchester 2, England.

Rood: Chemistry of Carbon Compounds, vol. IIA, 953, Elsevier Pub. Co., New York, New York, pp. 249–255.

Dryden: Jour. Amer. Chem. Soc., vol. 76, 1954, p. 2841.